United States Patent [19]

Schappert et al.

[11] Patent Number: 4,721,751
[45] Date of Patent: Jan. 26, 1988

[54] POLYUREA-POLYURETHANE ACRYLATE DISPERSIONS

[75] Inventors: Raymond F. Schappert, Pittsburgh; Joseph M. Makhlouf, Mars; Michael M. Chau, Gibsonia, all of Pa.

[73] Assignee: PPG Industries, Inc., Pittsburgh, Pa.

[21] Appl. No.: 30,309

[22] Filed: Mar. 26, 1987

[51] Int. Cl.$^4$ ............................................. C08L 75/12
[52] U.S. Cl. .................................... 524/773; 524/872; 524/873; 524/874; 524/875; 524/923; 525/454; 525/455; 525/459; 528/49; 528/48; 528/73; 528/75
[58] Field of Search ............... 524/773, 872, 873, 874, 524/875, 923; 525/454, 455, 459; 528/49, 48, 73, 75

[56] References Cited

U.S. PATENT DOCUMENTS

| | | | |
|---|---|---|---|
| 3,859,381 | 1/1975 | Hutchinson | 260/859 R |
| 3,868,431 | 2/1975 | Hutchinson | 260/859 R |
| 3,951,897 | 4/1976 | Matsuda et al. | 260/29.2 TN |
| 4,097,439 | 6/1978 | Darling | 260/31.2 N |
| 4,108,840 | 8/1978 | Friedlander | 528/46 |
| 4,153,776 | 5/1979 | Friedlander et al. | 528/49 |
| 4,305,857 | 12/1981 | Reischl | 260/29.2 TN |
| 4,305,858 | 12/1981 | Reischl | 260/29.2 TN |
| 4,425,468 | 1/1984 | Makhlouf et al. | 524/710 |
| 4,477,405 | 10/1984 | Makhlouf et al. | 264/250 |
| 4,503,199 | 3/1985 | O'Connor et al. | 525/455 |
| 4,605,756 | 8/1986 | Grogler et al. | 560/351 |

FOREIGN PATENT DOCUMENTS 2404239 1/1984 Fed. Rep. of Germany .
2022599A 5/1979 United Kingdom .

*Primary Examiner*—Maurice J. Welsh
*Attorney, Agent, or Firm*—Linda Pingitore

[57] ABSTRACT

A polymerizable ethylenically unsaturated urea urethane polymer dispersed in a polymerizable ethylenically unsaturated compound is prepared by a process which comprises reacting a polyisocyanate, at least a portion of which is a diisocyanate, with a polyfunctional amine containing primary and/or secondary amino groups in the presence of:

(a) a polyol, at least a portion of which is a polymeric polyol containing ethylenic unsaturation and having a carbon to oxygen ratio of at least 4/1;
(b) a diluent which is an ethylenically unsaturated compound free of active hydrogens; and
(c) an active hydrogen containing polymerizable ethylenically unsaturated compound; under conditions sufficient to form a polymerizable ethylenically unsaturated urea urethane polymer dispersed in a polymerizable ethylenically unsaturated compound.

The aforedescribed urea urethane polymer dispersions are particularly useful in formulating curable compositions suitable for use as adhesives and sealants.

34 Claims, No Drawings

POLYUREA-POLYURETHANE ACRYLATE DISPERSIONS

BACKGROUND OF THE INVENTION

The present invention relates to urea urethane acrylate polymers.

U.S. Pat. No. 4,425,468 is directed to polymerizable ethylenically unsaturated urea urethane polymer dispersions. In preparing the dispersions a polyisocyanate, at least a portion of which is a diisocyanate, is contacted with a polyfunctional amine containing primary and/or secondary amino groups in the presence of: a polyol, at least a portion of which is a polymeric polyol, free of ethylenic unsaturation, a diluent which is an ethylenically unsaturated compound free of active hydrogens, and an active hydrogen containing polymerizable ethylenically unsaturated compound under conditions sufficient to form a polymerizable ethylenically unsaturated urea urethane compound dispersed in the polymerizable ethylenically unsaturated compound free of active hydrogens.

The preparation of urea urethane acrylate polymer dispersions which contain moieties derived from a polyol containing ethylenic unsaturation and having a high carbon to oxygen ratio has been difficult to accomplish.

SUMMARY OF THE INVENTION

In accordance with the present invention there is provided a polymerizable ethylenically unsaturated urea urethane polymer dispersed in a polymerizable ethylenically unsaturated compound which is prepared by a process comprising reacting a polyisocyanate, at least a portion of which is a diisocyanate, with a polyfunctional amine containing primary and/or secondary amino groups in the presence of:

(a) a polyol, at least a portion of which is a polymeric polyol containing ethylenic unsaturation and having a carbon to oxygen ratio of at least 4/1;

(b) a diluent which is an ethylenically unsaturated compound free of active hydrogens; and (c) an active hydrogen containing polymerizable ethylenically unsaturated compound; under conditions sufficient to form a polymerizable ethylenically unsaturated urea urethane polymer dispersed in a polymerizable ethylenically unsaturated compound;

Also provided is a dispersion as set out above which is prepared by a two step process which comprises (a) reacting a polyisocyanate, at least a portion of which is a diisocyanate, with a polyfunctional amine containing primary and/or seconadary amino groups in the presence of a polyol, at least a portion of which is a polymeric polyol containing ethylenic unsaturation and having a carbon to oxygen ratio of at least 4/1, and a diluent which is an ethylenically unsaturated compound free of active hydrogens; under conditions sufficient to form an NCO group containing polyurea polyurethane dispersed in an ethylenically unsaturated compound; and (b) reacting the NCO group containing polyurea polyurethane dispersion with an active hydrogen containing polymerizable ethylenically unsaturated compound under conditions sufficient to react the NCO functionality with the active hydrogens thereby forming the polymerizable ethylenically unsaturated urea urethane polymer dispersion.

There is also provided a curable composition comprising the urea urethane polymer dispersion detailed above and a curing agent adapted to cure the polymer. The curable composition is characterized by an average RVT Brookfield viscosity of at least about 10,000 centipoise using a number 3 spindle at 20 RPM at a temperature of 23° C.

DETAILED DESCRIPTION OF THE INVENTION

The polymerizable ethylenically unsaturated urea urethane polymer dispersions of the present invention are prepared from the following principal components: a polyisocyanate, a polyfunctional amine containing primary and/or secondary amino groups, a polyol, at least a portion of which is a polymeric polyol containing ethylenic unsaturation and having a carbon to oxygen ratio of at least 4/1; a diluent which is an ethylenically unsaturated compound free of active hydrogens, and an active hydrogen containing ethylenically unsaturated compound. By "carbon to oxygen ratio" is meant the ratio of the number of carbon atoms to the number of oxygen atoms per molecule.

The polyisocyanate component can be aliphatic polyisocyanate, including a cycloaliphatic polyisocyanate or an aromatic polyisocyanate; preferably a diisocyanate is employed. In one preferred embodiment, at least a portion of the polyisocyanate is a diisocyanate. Useful aliphatic diisocyanates include ethylene diisocyanate, 1,2-diisocyanatopropane, 1,3-diisocyanatopropane, 1,4-butylene diisocyanate, 1,6-hexamethylene diisocyanate, lysine diisocyanate, 4,4'bis(isocyanato cyclohexyl methane), 2,2,4-trimethylhexane diisocyanate, and isphorone diisocyanate. Useful aromatic isocyanates include toluene diisocyanate, meta-xylene diisocyanate, para-xylene diisocyanate, 4-chloro-1,3-phenylene diisocyanate, 1,5-tetrahydro-naphthalene diisocyanate, diphenyl methane-4,4'-diisocyanate and 4,4'-dibenzyl diisocyanate. Also useful is 1,2,4-benzene triisocyanate. Mixtures of isocyanates can be utilized if desried.

The polyfunctional amine component contains primary and/or secondary amino groups. The polyfunctional amine component which contains primary and/or secondary amino groups can be a compound which is monofunctional with respect to amine and which has active hydrogen in addition to the amine hydrogens; e.g., hydroxyl groups. Preferably the Polyfunctional amine is a cyclic diamine. Useful polyfunctional amines include monoethanolamine, hydrazine, an ammonia-hydroxyethyl acrylate adduct, m-phenylene-diamine, propylenediamine, ethylenediamine, diethylenetriamine, menthane diamine, toluenediamine, isophoronediamine, N-methyl 1,3-propane diamine, poly(propylene ether)diamine and N,N'-dicyanoethyl poly(propylene ether)diamine; preferably isophoronediamine is utilized. The polyfunctional amine preferably has a molecular weight within the range of 30 to 2000, more preferably 60 to 1000, the molecular weight being determined on a number average basis.

The polyol component useful in preparing the claimed dispersion polymers is comprised of, at least in part, a polymeric polyol which contains ethylenic unsaturation. By polymeric is meant those materials having a molecular weight of 600 or more, preferably 1000 or more, more preferably 1000 to 10,000 on a number average basis. The polymeric polyol which contains ethylenic unsaturation has a carbon to oxygen ratio of at least 4/1. That is, the ethylenically unsaturated polymeric polyol is an essentially hydrocarbon polyol. Preferably the polyol component can contain some low molecular weight polyol, that is, those having a molecular weight of 260 or less. Although it has been specified that the molecular weight of the polymeric polyol can be 600 or more, and the low molecular weight polyol less than 260, it should be appreciated that polyols having molecular weights within these limits can also be used. Broadly speaking, the molecular weight of the polyol component should range from about 62 to 10,000, the molecular weight being determined on a number average basis. Preferably the polyol has an average hydroxyl functionality of at least about two. Hydroxyl functionality is defined to be the average number of hydroxyl groups per molecule. In this connection, with regard to the ethylenically unsaturated polyol having a carbon to oxygen ratio of at least 4/1, in some instances the average hydroxyl functionality may be somewhat greater than two or less than two depending upon the specific preparative process for the polyol. For example, polybutadiene polyols which are provided commercially by Nippon Soda Company, Limited under the designation Nisso PB (e.g., G-1000, G-2000 and G-3000) are indicated as having an average hydroxyl functionality of greater than 1.6; polybutadiene polyols commercially available from Arco under the designation Poly Bd (e.g. R45HT) are indicated as having an average hydroxyl functionality ranging from 2.2 to 2.6. It should be understood that even though the average functionalities are somewhat less than two, these polyols are contemplated as being within the scope of the present invention.

Examples of the low molecular weight polyols are ethylene glycol, propylene glycol, thiodiethanol, 1,4-butane diol, dipropylene glycol, trimethylolmethane, trimethylolpropane, trimethylolethane, pentaerythritol, dipentaerythritol, glycerol, and substituted polyols such as monoallyl glycerol. Examples of the ethylenically unsaturated polymeric polyols are hydroxyl functional polydiene polymers such as hydroxyl functional polybutadiene and hydroxyl functional polyisoprene; also useful are polyester polyols of dimer fatty acids. Examples of polymeric polyols without ethylenic unsaturation include polyethylene glycol, polypropylene glycol, poly(1,2-butylene glycol), and poly(1,4-butylene glycol).

Preferably the polymeric polyol containing ethylenic unsaturation is a hydroxyl functional homopolymer or copolymer of a polydiene. The polydiene polymers include polymers of 1,3-dienes containing from 4 to 12 and preferably from 4 to 6 carbon atoms. Typical dienes include 1,3-butadiene which is preferred, 2,3-dimethyl-1,3-butadiene, isoprene and piperylene. Also, copolymers of 1,3-butadiene and a monomer copolymerizable with 1,3-butadiene such as isoprene, acrylonitrile, and piperylene can be used. Other polymerizable monomers such as methyl methacrylate, acrylic acid, and styrene can also be used. Also useful herein are partially hydrogenated polydiene polymers.

The diluent is used to reduce the concentration of the polyurea-polyurethane polymer dispersion. Typically the diluent is an ethylenically unsaturated compound free of active hydrogens. Examples of the ethylenically unsaturated compound free of active hydrogens include vinyl aromatic compounds, vinyl aliphatic compounds and alkylacrylates or methacrylates. Suitable such compounds include styrene, vinyl toluene, vinyl versatate, methyl acrylate, ethyl acrylate, propyl acrylate, isopropyl acrylate, butyl acrylate, hexyl acrylate, isobornyl methacrylate, 2-ethylhexyl acrylate, methyl methacrylate, ethyl methacrylate, propyl methacrylate, butyl methacrylate, 2-ethylhexyl methacrylate, isodecyl methacrylate and phenoxyethyl methacrylate. Mixtures of these diluents can be utilized if desired. Preferably, vinyl versatate and isobornyl methacrylate are utilized.

Examples of the active hydrogen-containing ethylenically unsaturated compound are hydroxyalkyl acrylates or methacrylates, and beta hydroxy unsaturated esters formed from monoepoxides or diepoxides and acrylic or methacrylic acid. Suitable compounds include 2-hydroxyethyl acrylate, 2-hydroxyethyl methacrylate, 2-hydroxylpropyl acrylate, 3-hydroxypropyl acrylate, 2-hydroxypropyl methacrylate, 3-hydroxypropyl methacrylate an adduct of 2-hydroxyethyl acrylate and epsilon-caprolactone and an adduct of methacrylic acid and CARDURA E. Also suitable is t-butyl aminoethyl methacrylate, although the reaction is somewhat sluggish. Preferably, 2-hydroxyethyl acrylate and 2-hydroxyethyl methacrylate are utilized.

It should be understood that, although each of the reactive components in the process for preparing the aforedescribed polyureapolyurethane polymers has been discussed separately, the present invention also contemplates the use of a single compound having the functionality of the polyol and the active hydrogen-containing polymerizable ethylenically unsaturated compound. An example of such a compound is glycerol monoacrylate.

The ethylenically unsaturated urea urethane polymers of the present invention are dispersions. The particle size of the polymer dispersions can be determined from transmission light scattering measurements and application of the Mie Light Scattering Theory. A detailed discussion of this method can be found in P. E. Pierce and C. E. Cowan, "Measurement of Particle Size of Anionic Electrodeposition Resin Micelles and Factors Which Influence Micelle Size," Journal of Paint Technology, Vol. 44, No. 568, pages 61–67, May 1972 and also E. A. Collins, J. A. Davidson, and C. A. Daniels, "Review of Common Methods of Particle Size Measurement," Journal of Paint Technology, Vol. 47, No. 604, pages 35–56, May 1975. When the percent light transmittance is controlled to within the range of from about 20 percent to about 90 percent, the particle size of the dispersion broadly falls within the range of from about 200 Angstroms to about 3000 Angstroms.

The dispersions of the present invention can also be characterized by their opaqueness which is characteristic of a dispersion. In a preferred embodiment the aforesaid dispersions can be further characterized in that when one percent by weight of a good solvent for the polymer such as dimethylformamide is added to the dispersion, the viscosity of the dispersion increases. This distinguishes the dispersion from true solutions in which the addition of a good solvent for the polymer would cause a viscosity decrease.

The aforedescribed polymerizable ethylenically unsaturated urea-urethane polymer dispersions of the present invention can be prepared in a one step reaction in the following manner. The polyisocyanate is contacted with the polyfunctional amine containing primary and/or secondary amino groups in the presence of the polyol, diluent and active hydrogen-containing polymerizable ethylenically unsaturated compound under conditions sufficient to form the polymerizable ethylenically unsaturated urea-urethane polymer dispersion.

Preferably the polymers described above are prepared in a two step reaction; for example, in the first step the polyisocyanate is contacted with the polyfunctional amine in the presence of the polyol and the diluent under conditions sufficient to form an NCO-group containing polyurea-polyurethane dispersion. In the second step, the active hydrogen- containing ethylenically unsaturated compound is contacted with the NCO-group containing polymer formed in the first step to end-cap the polymer with polymerizable ethylenic unsaturation. In some circumstances, depending upon the particular reactants, it may be judicious to have present in the first step a portion of the active hydrogen-containing ethylenically unsaturated compound and a portion of the polyol present in the second step. Under this type of procedure problems with viscosity variation and foaming as a result of contamination with water can be controlled. In forming dispersion polymers, by pre-reacting about three- fourths of the active hydrogen-containing ethylenically unsaturated compound prior to forming the dispersion a portion of the diisocyanate is initially capped at one end to better control chain length. In a further preferred embodiment the polyfunctional amine and polyol are premixed before being contacted with the polyisocyanate. Moreover, some polyol can be withheld during the dispersion forming step and added prior to completion of end-capping for viscosity adjustment. Low viscosity resins can readily be produced in this manner.

It should be understood that although the disclosure has focused on a detailed discussion of particular embodiments of both the one-step and two-step reactions, the invention is not to be thusly limited. Rather, other equivalent embodiments are contemplated by the Present invention and fall within the scope of the claims. For example, in one embodiment polyisocyanate, polyfunctional amine, and polyol are reacted to form a hydroxyl rich intermediate polymer which is reacted with additional polyisocyanate prior to end-capping with active hydrogen-containing ethylenically unsaturated compound.

In preferred embodiments of both the one-step and two-step reactions, the ethylenic unsaturation in the resultant polymerizable ethylenically unsaturated urea urethane polymer is in the terminal position.

The amount of polymer forming reactants utilized in preparing the claimed polymers can vary, but generally the equivalent ratio of isocyanate to active hydrogen in the polyol and polyfunctional amine is within the range of 1.1:1 to 2.0:1, and the equivalent ratio of polyol to polyfunctional amine is within the range of 0.75:1 to 35:1. Preferably, the equivalent ratio of isocyanate to active hydrogen in the polyol and polyfunctional amine is within the range of 1.2:1 to 1.5:1; the preferred equivalent ratio of polyol to polyfunctional amine is within the range of 1:1 to 10:1. Other ingredients are typically utilized with the polymer forming components described above, such as free radical inhibitors to prevent premature reaction of the ethylenically unsaturated compound and catalyst to accelerate the reaction between polyol and polyisocyanate. These materials are typically present in small amounts, generally from about 0.01 percent to about 2 percent by weight.

Also provided by the present invention is a curable composition comprising the ethylenically unsaturated urea urethane polymer dispersion described above and a curing component adapted to cure the polymer. The curable composition can be characterized as having an average RVT Brookfield viscosity of at least about 10,000 centipoise using a number 3 spindle at 20 RPM at a temperature of 23° C. The claimed dispersion polymers are particularly useful for formulating curable compositions such as adhesives and sealants. The curing component of the curable composition comprises a free radical initiating catalyst. Examples of free radical catalysts include tertiary butyl perbenzoate, tertiary butyl Peroctoate, methyl ethyl ketone peroxide, 1,1-ditertiarybutylperoxy-3,3,5-trimethylcyclohexane, and mixtures thereof. Preferred catalysts are tertiary butyl perbenzoate, tertiary butyl peroctoate, 1,1-ditertiary-butylperoxy-3,3,5-trimethylcyclohexane, and mixtures thereof. The free radical initiating catalyst is present in minor amounts, generally from about 0.1 to about 10 percent by weight, usually from about 0.5 to about 4 percent by weight based on total weight of the composition.

In a preferred embodiment the claimed curable compositions additionally comprise a filler and a thixotrope. Examples of suitable fillers include calcium carbonate, calcium oxide, hydrous magnesium silicate, amorphous silicas, aluminum powder, mica, titanium dioxide, clay, barium sulfate, carbon black, alumina and glass fibers. Examples of suitable thixotropes include fumed silicas, bentone clays, treated calcium carbonates, gum arabic and sodium carboxymethyl cellulose. In such a preferred embodiment the thixotrope is generally present in an amount ranging from about 1 to about 70 percent by weight, preferably from about 3 to about 15 percent by weight and the filler is present in an amount ranging from about 1 to about 80 percent by weight, preferably from about 20 to about 60 percent by weight, the percentages based on the total weight of the composition.

It should be understood that if desired the curable compositions of the present invention can be cured by ultraviolet light or electron beam in the instance wherein an external chemical curing component is not added to the composition. Use of ultraviolet light or electron beam is contemplated to be a curing component within the scope of the claimed invention.

The urea urethane polymer dispersion is generally present in the curable composition in an amount ranging from about 20 percent by weight to about 95 percent by weight, preferably about 40 percent by weight to about 60 percent by weight, the percentages based on the total weight of the composition.

Also provided is a substrate having the claimed curable composition applied thereto. As has been mentioned above the curable compositions of the present invention have an average RVT Brookfield viscosity of at least about 10,000 centipoises using a number 3 spindle at 20 RPM at a temperature of 23° C. Preferably the curable compositions have an average RVT Brookfield viscosity of at least about 100,000 centipoise determined in the same manner.

The claimed curable compositions are particularly suitable for use as sealants or adhesives.

The claimed curable compositions can optionally contain other components such as rheology control agents, ultraviolet light stabilizers and adjuvant resinous ingredients.

The polymer dispersions of the present invention which are prepared with at least a portion of ethylenically unsaturated polyol having a high carbon to oxygen ratio result in several unexpected and surprising advantages. Curable sealant or adhesive compositions formulated with these dispersions demonstrate improved strength and cohesive failure. Cohesive failure is the preferred mode of failure for an adhesive. It is a measure of the ultimate strength of the adhesive.

The following examples are only illustrative of the invention and are not intended to be limiting.

EXAMPLE I

Preparation of poly (urea-urethane) acrylate dispersion utilizing a polybutadiene polyol.

| Charge | Ingredients | Parts by Weight (grams) |
| --- | --- | --- |
| A | toluene diisocyanate | 750.00 |
|   | vinyl versatate | 677.00 |
|   | isobornyl methacrylate | 203.00 |
|   | methyl parabenzoquinone | 0.38 |
|   | IONOL[1] | 3.80 |
| B | NIAX-1025[2] | 735.00 |
|   | polybutadiene polyol[3] | 328.00 |
|   | dipropylene glycol | 111.00 |
|   | isophoronediamine | 221.00 |
| C | dibutylin dilaurate | 3.80 |
| D | 2-hydroxyethyl acrylate | 150.00 |
|   | methyl parabenzoquinone | 0.38 |
|   | IONOL | 3.80 |
| E | 2-hydroxyethyl methacrylate | 155.00 |

[1] 2,6-ditertiarybutyl para-cresol commercially available from Koppers Chemical Company
[2] This polypropylene glycol had a molecular weight of 1000 and is commercially available from Union Carbide Corporation.
[3] This hydroxyl terminated polybutadiene polyol is commercially available from Nippon Soda Company, Ltd. under the trademark designation NISSO-PB G-1000. This polyol had an average hydroxyl functionality of greater than 1.6 and a number average molecular weight of 1350.

A reactor vessel equipped with thermometer, stirrer, condenser and nitrogen inlet tube was charged with (A) at ambient temperature. Charge (B) was then added over approximately a one hour period with exotherm to a temperature less than 60° C. The reaction mixture was held at a temperature between 60° C. and 65° C. for one hour. Subsequently, charge (C) was added and once again the reaction mixture was held at the aforesaid temperature for a one hour period. Charge (D) was then added and the reaction mixture held for one hour at the temperature given above. This holding period was followed by the addition of charge (E) and the reaction mixture was held at a temperature between 65° C. and 70° C. until the isocyanate equivalent weight was greater than 10,000. The resultant dispersion polymer had a total solids content of 76.7 percent determined at 150° C. for two hours. Brookfield viscosity determinations using a number 7 spindle at 1, 5 and 10 RPM yielded a viscosity of 320,000, 384,000 and 440,000 centipoises, respectively.

EXAMPLE II

Preparation of Poly(urea-urethane) acrylate dispersion without polybutadiene polyol.

| Charge | Ingredients | Parts by Weight (grams) |
| --- | --- | --- |
| A | toluene diisocyanate | 833.00 |
|   | vinyl versatate | 431.00 |
|   | methyl parabenzoquinone | 0.31 |
|   | IONOL | 3.10 |
| B | 2-hydroxyethyl acrylate | 167.00 |
| C | NIAX-1025 | 1090.00 |
|   | dipropylene glycol | 123.00 |
|   | isophoronediamine | 246.00 |
| D | dibutylin dilaurate | 3.10 |
| E | 2-hydroxyethyl methacrylate | 172.00 |

A reactor vessel which was equipped with thermometer, stirrer, condenser and nitrogen inlet tube was charged with (A) and heated to a temperature of 60° C. Charge (B) was then added and the reaction mixture held at 60° C. for one hour. The reaction mixture was then cooled to 30° C and Charge (C) was added over a one hour period while maintaining the temperature below 60° C. Subsequently the reaction mixture was heated to 60° C. and held at this temperature for one hour followed by the addition of (D). The reaction mixture was then heated at 75° C. and held at this temperature for one hour. Charge (E) was then added and the reaction mixture held at 75° C. until the isocyanate equivalent weight was greater than 10,000. The resultant urea urethane acrylate dispersion had a total solids content of 86.4 percent determined at 150° C. for two hours. Brookfield viscosity determinations using a number 7 spindle at 1, 5 and 10 RPM yielded viscosities of 6,880,000, 5,920,000 and 5,432,000 centipoises, respectively.

EXAMPLE III

Preparation and evaluation of an adhesive composition using the urea-urethane acrylate polymer dispersion of Example I, above, containing polybutadiene moieties.

| Ingredients | Parts by Weight (grams) |
| --- | --- |
| rubber modified urea-urethane acrylate of Example I[4] | 121.70 |
| lactone-acrylate adduct[5] | 28.48 |
| A-174[6] | 3.00 |
| TRIGONOX 29B75[7] | 2.40 |
| aluminum powder | 40.00 |
| calcium carbonate | 40.00 |
| EPON 828[8] | 15.00 |
| CAB-O-SIL[9] | 11.00 |

[4] The preparation is shown in Example I, above.
[5] This adduct was prepared in the following manner:

| Ingredients | Parts by Weight (grams) |
| --- | --- |
| epsilon-caprolactone | 8280.0 |
| 2-hydroxyethyl methacrylate | 7120.0 |
| TINUVIN P[a] | 14.0 |
| stannoic octoate | 15.2 |
| IONOL | 22.8 |

[a] an ultraviolet light stabilizer which is commercially available from Ciba-Ceigy.
All the ingredients were charged to a suitable reactor vessel equipped with air sparge, thermometer, and condenser. The ingredients were heated to a temperature of 120° C. and held at this temperature for a sufficient time to achieve a total solids content of 84.4 percent determined at 110° C. for one hour an acid value of 6.5 and a Gardner Holdt viscosity of A—. The viscosity and acid value were determined every 4 hours. At the same time the progress of the reaction was also monitored by infrared spectroscopy. The reaction required two days to complete.
[6] Gamma-methacryloxypropylsilane which is commercially available from Union Carbide.
[7] 1,1-ditertiarybutyl peroxy 3,3,5-trimethylcyclohexane commercially available from Noury Chemical.
[8] The diglycidyl ether of bisphenol A which is commercially available from Shell Chemical Company.
[9] Hydrophobic fumed silica which is commercially available -continued from Cabot.

The adhesive composition was prepared by combining, with agitation, the ingredients in the order listed above. The composition had an HBT Brookfield viscosity of 230,000 centipoise using an E spindle at 2.5 RPM at a temperature of 23° C. All of the test samples were cured at 350° F. (177° C.) for one hour.

The composition was evaluated for Lap Shear Strength according to ASTM D 1002. Lap Shear Bonds for evaluation were prepared in the following manner: Two strips of cold rolled steel measuring 1 inch×4 inches×0.031 inch (2.54 centimeters×10.16 centimeters×0.079 centimeters) were used. A 6 mil thick film of the composition was applied onto one of the metal strips and then a second metal strip was placed over top of the first strip so that a one half inch (1.27 centimeters) section of the length of both panels overlapped. The ends of the strips were pulled with an INSTRON measuring device at a rate of 0.5 inches (1.27 centimeters) per minute.

The composition was evaluated for T-peel strength according to ASTM D1876. T-peel bonds for evaluation were parepared as follows. Two strips of cold rolled steel measuring 1 inch×6 inches×0.031 inch (2 54 centimeters×15.24 centimeters×0.079 centimeters) were used. A 6 mil thick film of adhesive composition was applied onto one of the metal strips and then a second metal strip was placed overtop the first strip so that a 4 square inch (25.81 square centimeter) section was bonded. Then the two ends of the panels which were not bonded were bent to form a T-shape. The load for the T-peel strength determination was applied at 5.0 inch (12.7 centimeters) per minute.

Impact Strength was determined according to General Motors Testing Method TM 45-76. Bonds for evaluation were prepared as has been detailed above for Lap Shear Strength.

Lap Shear Strength was measured in pounds per square inch (psi); Impact Strength was measured in inch-pounds; T-peel Strength was measured in pounds per linear inch.

Percent Cohesive Failure was determined as follows: Percent Cohesive failure was a measure of the cohesive ability of the adhesive. The scale ranged from 0 percent meaning that the adhesive pulled away from one metal surface completely to 100 percent meaning that the adhesive remained adhered to each metal surface but that the adhesive bonds were severed. Values within this range were ascribed by observing that percentage of the area of the applied adhesive film where there was cohesion.

The values presented in Table I are an average of two separate determinations.

EXAMPLE IV

Preparation and evaluation of adhesive composition using the urea-urethane acrylate polymer dispersion of Example II, above, which contains no polybutadiene moieties.

| Ingredients | Parts by Weight (grams) |
| --- | --- |
| urea-urethane acrylate of Example II[10] | 112.60 |
| lactone-acrylate adduct[11] | 28.48 |
| A-174 | 3.00 |
| TRIGONOX 29B75 | 2.40 |
| vinyl versatate | 5.00 |
| isobornyl methacrylate | 5.00 |
| aluminum powder | 40.00 |
| calcium carbonate | 40.00 |
| EPON 828 | 15.00 |
| CAB-O-SIL | 11.00 |

[10]The preparation is shown in Example II, above.
[11]The preparation is shown in footnote (5), above.

The adhesive composition was prepared and evaluated as detailed in Example III, above. The rsults of the evaluations are set out in Table I, below. The compositions had an HBT Brookfield viscosity of 1, 900,000 centipoise using an E spindle at 2,5 RPM at a temperature of 23° C.

TABLE I

| Composition | Lap Shear Strength (psi) | Percent Cohesive Failure | Impact Strength (inch-pounds) | Percent Cohesive Failure | T-peel (pounds/inch) | Percent Cohesive Failure |
| --- | --- | --- | --- | --- | --- | --- |
| Example III - polybutadiene modified | 1841 | 50 | 28.5 | 72.5 | 22.2 | 95 |
| Example IV - no polybutadiene | 1916 | 50 | 20 | 55 | 11.7 | 42.5 |

As the data above shows, the curable composition formulated with the polybutadiene modified dispersion polymer ®xhibited improved impact strength, T-peel strength and percent cohesive failure determined after the impact test and T-peel test.

EXAMPLE V

Preparation of poly (urea-urethane) acrylate dispersion utilizing polyisoprene polyol.

| Charge | Ingredients | Parts by Weight (grams) |
| --- | --- | --- |
| I | vinyl versatate | 777.0 |
|  | isobornyl methacrylate | 234.0 |
|  | methyl parabenzoquinone | 0.78 |
|  | IONOL | 7.80 |
| II | polyisoprene polyol[12] | 676.0 |
|  | 2-hydroxyethyl acrylate | 154.0 |
| III | toluene diisocyanate | 774.0 |
| IV | NIAX-1025 | 759.0 |
|  | isophorone diamine | 228.0 |
|  | dipropylene glycol | 114.0 |
| V | dibutyltin dilaurate | 3.9 |
| VI | 2-hydroxyethyl methacrylate | 160.0 |
| VII | CYANOX 2246[13] | 6.7 |

[12]This hydroxyl terminated polyisoprene had a molecular weight of about 2,000 to 3,000, a hydroxyl value of about 0.90 milliequivalents per gram and can be prepared according to U.S. Pat. No. 3,673,168. The material was provided by Arco.
[13]This antioxidant is commercially available from American Cyanamid.

A reactor vessel equipped with thermometer, stirrer, condenser and nitrogen inlet tube was charged with (I) at ambient temperature. Charge (II) was then added while mixing followed by the addition of Charge (III) with resulting exotherm. The reaction mixture was then heated to 60° C. and held at this temperature for one hour. The reaction mixture was then cooled to less than 40° C. and charge (IV) was added over a 30 minute period while heating to about 65° C. The reaction mixture was held for one hour at 65° C. followed by the addition of Charge (V) with resulting exotherm. The mixture was held for one hour at 70° C. followed by the addition of Charge (VI) at the same temperature. The reaction was held at 70° C. until the isocyanate equivalent weight was greater than 10,000. Charge (VII) was then added with agitation. The resultant dispersion polymer had a total solids content of 84.16 percent determined at 150° C. for two hours. Brookfield viscosity determinations using a number 7 spindle at 1, 5 and 10 RPM yielded a viscosity of 880,000, 736,000 and 624,000 centipoises, respectively.

EXAMPLE VI

This Example is similar to Example I, above, with the exception that the polybutadiene polyol which was utilized had a number average molecular weight of 3,000.

| Charge | Ingredients | Parts by Weight (grams) |
|---|---|---|
| I | toluene diisocyanate | 750.0 |
|  | vinyl versatate | 713.0 |
|  | isobornyl methacrylate | 214.0 |
|  | methyl parabenzoquinone | 0.38 |
|  | IONOL | 3.8 |
| II | NIAX-1025 | 869.0 |
|  | polybutadiene polyol[14] | 328.0 |
|  | dipropylene glycol | 111.0 |
|  | isophoronediamine | 221.0 |
| III | dibutyltin dilaurate | 3.8 |
| IV | 2-hydroxyethyl acrylate | 150.0 |
|  | methyl parabenzoquinone | 0.38 |
|  | IONOL | 3.8 |
| V | 2-hydroxyethyl methacrylate | 155.0 |

[14]This hydroxyl terminated polybutadiene was commercially available from NIPPON Soda Company, Limited, under the code G-3000. The polyol had an average hydroxyl functionality of greater than 1.6 and a number average molecular weight of 3,000.

This urea urethane acrylate dispersion was prepared as has been described above in Example V. The resultant polymer had a total solids content of 70.94 percent determined at 150° C. for two hours. Brookfield viscosity determinations using a number 7 spindle at 1, 5 and 10 RPM yielded a viscosity of 1,360,000, 704,000 and 608,000 centipoises, respectively.

EXAMPLE VII

This Example is similar to Example I, above with the exception that the polybutadiene polyol which was utilized had a number average molecular weight of 2000.

| Charge | Ingredients | Parts by Weight (grams) |
|---|---|---|
| I | toluene diisocyanate | 750.0 |
|  | vinyl versatate | 720.0 |
|  | isobornyl methacrylate | 216.0 |
|  | methyl parabenzoquinone | 0.38 |
|  | IONOL | 3.8 |
| II | NIAX 125 | 735.0 |
|  | polybutadiene polyol[15] | 486.0 |
|  | dipropylene glycol | 111.0 |
|  | isophorone diamine | 221.0 |
| III | dibutyltin dilaurate | 3.8 |
| IV | 2-hydroxyethyl acrylate | 150.0 |
|  | methyl parabenzoquinone | 0.38 |
|  | IONOL | 3.8 |
| V | 2-hydroxyethyl methacrylate | 155.0 |

[15]This hydroxyl terminated polybutadiene was commercially available from Nippon Soda Company Limited under the code G-2000. The polyol had an average hydroxyl functionality of greater than 1.6 and a number average molecular weight of 2,000.

This urea urethane arcylate dispersion was prepared as has been detailed above in Example V. The resultant polymer had a total solids content of 71.8 percent determined at 150° C. for two hours. Brookfield viscosity determinations using a number 7 spindle at 1, 5 and 10 RPM yielded a viscosity of 1,280,000, 848,000 and 536,000 centiposes, respectively.

EXAMPLE VIII

This example illustrates the preparation of a dispersion using as the ethlenically unsaturated polyol a polyester prepared from dimer fatty acid and diethylene glycol.

| Charge | Ingredients | Parts by Weight (grams) |
|---|---|---|
| I | toluene diisocyanate | 357.0 |
|  | isodecyl methacrylate | 1371.0 |
|  | methyl parabenzoquinone | 0.4 |
|  | IONOL | 4.0 |
| II | 2-hydroxyethyl acrylate | 72.0 |
| III | DEG-dimerate[16] | 2056.0 |
|  | isophoronediamine | 35.0 |
|  | deionized water | 4.0 |
| IV | dibutyltin dilaurate | 4.0 |
| V | 2-hydroxyethyl methacrylate | 27.0 |

[16]This polyol had a number average molecular weight of 2935 and a hydroxyl number of 81.42. It was prepared in the following manner:
A reactor vessel equipped with nitrogen inlet tube, thermometer, stirrer, condenser and glycol return column was charged with 3568 grams of diethylene glycol, 12,588 grams of EMPOL 1016 (this is Dimer fatty acid commercially available from Emery Chemicals) and 7.5 grams of dibutyltin oxide and heated to 220° C. (The head temperature was maintained at less than 100° C.) The reaction mixture was held at this temperature until an acid value of less than 1.0 was obtained. The water of reaction was collected. The reaction required approximately 34 hours to complete. The reaction product had a total solid content of 95.21 percent determined at 150° C. for two hours and a Brookfield viscosity of 9300 centipoises.

A reactor vessel equipped with thermometer, stirrer, condenser and nitrogen inlet tube was charged with (I) and (II) and heated to 60° C. The reaction mixture was held at this temperature for one hour and then cooled to 20° C. The reaction mixture was held at 60° to 65° C. for one hour followed by the addition of (IV) with a one hour hold at 70° to 75° C. Charge (V) was added followed by a hold at 70° C. to 75° C. until the isocyanate equivalent weight was greater than 10,000. The resultant polymer had a total solids content of 64.05 percent determined at 150° C for two hours. Brookfield viscosity determinations using a number 7 spindle at 2, 10 and 20 RPM yielded a viscosity of 248,000, 222,000 and greater than 200,000 centipoise, respectively.

EXAMPLE IX

Preparation and evaluation of adhesive compositions using the polymer dispersions of Examples VI and VII, above.

| Ingredients | Compositions Parts by Weight (grams) | |
| --- | --- | --- |
| | A | B |
| urea-urethane acrylate of Example VI | 121.7 | |
| urea-urethane acrylate of Example VII | | 121.7 |
| methyl parabenzoquinone | 3.28 | 3.28 |
| isobornyl methacrylate | 28.5 | 28.5 |
| A-174 | 3.0 | 3.0 |
| TRIGONOX 29B75 | 1.8 | 1.8 |
| aluminum powder | 40.0 | 40.0 |
| calcium carbonate | 40.0 | 40.0 |
| EPON 828 | 15.0 | 15.0 |
| CAB-O-SIL | 12.0 | 12.0 |

The adhesive compositions were prepared by combining with agitation, the ingredients in the order listed above. The viscosity of Composition A was not determined; Composition B had an HBT Brookfield viscosity of 5,600,000 centipoise using an E spindle at 2.5 RPM at a temperature of 23° C. The test samples were cured at 350° F. (177° C.) for one hour. The adhesive compositions were evaluated for Lap Shear Strength, T-peel Strength and Percent Cohesive failure as has been detailed above in Example III.

The values presented in Table II are an average of two separate determinations.

TABLE II

| Composition | Lap Shear Strength (psi) | Percent Cohesive Failure | T-peel (pounds/inch) | Percent Cohesive Failure |
| --- | --- | --- | --- | --- |
| A | 2112 | 60 | not run | not run |
| B | 1932 | 70 | 22.8 | 80 |

What is claimed is:

1. A polymerizable ethylenically unsaturated urea urethane polymer dispersed in a polymerizable ethylenically unsaturated compound which is prepared by a process which comprises:
   (a) reacting a polyisocyanate, at least a portion of which is a diisocyanate, with a polyfunctional amine containing primary and/or secondary amino groups in the presence of a polyol, at least a portion of which is a polymeric polyol containing ethylenic unsaturation and having a carbon to oxygen ratio of at least 4/1, and a diluent which is an ethylenically unsaturated compound free of active hydrogens, under conditions sufficient to form an NCO group containing polyurea polyurethane dispersed in an ethylenically unsaturated compound; and
   (b) reacting the NCO group containing polyurea polyurethane dispersion with an active hydrogen containing polymerizable ethylenically unsaturated compound under conditions sufficient to react the NCO functionality with the active hydrogens thereby forming the polymerizable ethylenically unsaturated urea urethane polymer dispersion.

2. The polymer dispersion of claim 1 wherein the ethylenic unsaturation in the ethylenically unsaturated urea-urethane polymer is in the terminal position.

3. The polymer dispersion of claim 1 wherein the polyfunctional amine and polyol are premixed before being contacted with the polyisocyanate.

4. The polymer dispersion of claim 1 wherein the polyisocyanate is selected from the group of aromatic polyisocyanates and aliphatic polyisocyanates.

5. The polymer dispersion of claim 4 wherein the polyisocyanate is a diisocyanate.

6. The polymer dispersion of claim 1 wherein the polymeric polyol containing ethylenic unsaturation is a polydiene polyol.

7. The polymer dispersion of claim 6 wherein the polymeric polyol containing ethylenic unsaturation is a hydroxyl terminated polybutadiene polyol.

8. The polymer dispersion of claim 1 wherein the active hydrogen containing ethylenically unsaturated compound is a hydroxyalkyl acrylate or methacrylate.

9. The polymer dispersion of claim 1 wherein the ethylenically unsaturated compound free of active hydrogens is selected from vinyl aromatic compounds, vinyl aliphatic compounds and alkyl acrylates or methacrylates.

10. The polymer dispersion of claim 1 wherein the polyfunctional amine is a diamine.

11. The polymer dispersion of claim 10 wherein the diamine is a cyclic diamine.

12. The polymer dispersion of claim 11 wherein the diamine is isophoronediamine.

13. The polymer dispersion of claim 1 wherein the equivalent ratio of isocyanate to active hydrogen in the polyol and the polyfunctional amine is within the range of 1.1/1 to 2.0/1 and the equivalent ratio of polyol to polyfunctional amine is within the range of 0.75/1 to 35/1.

14. A polymerizable ethylenically unsaturated urea urethane polymer dispersed in a polymerizable ethylenically unsaturated compound which is prepared by a process comprising reacting a polyisocyanate, at least a portion of which is diisocyanate, with a polyfunctional amine containing primary and/or secondary amino groups in the presence of:
   (a) a polyol, at least a portion of which is a polymeric polyol containing ethylenic unsaturation and having a carbon to oxygen ratio of at least 4/1;
   (b) a diluent which is an ethylenically unsaturated compound free of active hydrogens; and
   (c) an active hydrogen containing polymerizable ethylenically unsaturated compound; under conditions sufficient to form a polymerizable ethylenically unsaturated urea urethane polymer dispersed in a polymerizable ethylenically unsaturated compound.

15. A curable composition comprising:
I. a polymerizable ethylenically unsaturated urea urethane polymer dispersed in a polymerizable ethylenically unsaturated compound which is prepared by a process which comprises
   (a) reacting a polyisocyanate, at least a portion of which is a diisocyanate, with a polyfunctional amine containing primary and/or secondary amino groups in the presence of a polyol, at least a portion of which is a polymeric polyol containing ethylenic unsaturation and having a carbon to oxygen ratio of at least 4/1, and a diluent which is an ethylenically unsaturated compound free of active hydrogens under conditions sufficient to form an NCO group containing polyurea polyurethane dispersed in an ethylenically unsaturated compound;
   (b) reacting the NCO group containing polyurea polyurethane dispersion with an active hydrogen containing polymerizable ethylenically unsaturated compound under conditions sufficient to react the NCO functionality with the active hydrogens thereby forming the polymerizable ethylenically unsaturated urea urethane polymer dispersion;

II. a curing component adapted to cure the urea urethane polymer dispersion; said curable composition being characterized by an average RVT Brookfield viscosity of at least about 10,000 centipoise using a number 3 spindle at 20 RPM at a temperature of 23° C.

16. The curable composition of claim 15 wherein the composition additionally comprises an adhesion promoter.

17. The curable compositoin of claim 15 wherein the composition additionally comprises a thixotrope.

18. The curable composition of claim 15 wherein the composition additionally comprises a filler.

19. The curable composition of claim 15 wherein the equivalent ratio of isocyanate to active hydrogen in the polyol and the polyfunctional amine is within the range of 1.1/1 to 2.0/1 and the equivalent ratio of polyol to polyfunctional amine is within the range of 0.75/1 to 35/1.

20. The curable composition of claim 15 wherein the polyfunctional amine and polyol are premixed before being contacted with the polyisocyanate.

21. The curable composition of claim 15 wherein the organic polyisocyanate is selected from aliphatic and aromatic polyisocyanates.

22. The curable composition of claim 21 wherein the isocyanate is a diisocyanate.

23. The curable composition of claim 1 wherein the polyol has an average hydroxyl functionality of at least two.

24. The curable composition of claim 23 wherein the polymeric polyol containing ethylenic unsaturation is a polydiene polyol.

25. The curable composition of claim 24 wherein the polydiene polyol containing ethylenic unsaturation is a hydroxyl terminated polybutadiene.

26. The curable composition of claim 15 wherein the active hydrogen containing ethylenically unsaturated compound is a hydroxyalkyl acrylate or methacrylate.

27. The curable composition of claim 15 wherein the ethylenically unsaturated compound free of active hydrogen is selected from vinyl aromatic compounds, vinyl aliphatic compounds and alkyl acrylates or methacrylates.

28. The curable composition of claim 1 wherein the polyfunctional amine is a diamine.

29. The curable composition of claim 1 wherein a portion of the active hydrogen containing polymerizable ethylenically unsaturated compound is present in step (a).

30. The curable composition of claim 15 wherein a portion of the polyol is present in step (b).

31. The curable composition of claim 15 wherein the composition comprises:

I. urea urethane polymer dispersion present in an amount ranging from about 20 percent by weight to about 95 percent by weight;

II. curing component present in an amount ranging from about 0.1 percent by weight to about 10 percent by weight;

III. a thixotrope present in an amount ranging from about 1 percent by weight to about 70 percent by weight; and IV. a filler present in an amount ranging from about 1 percent by weight to about 80 percent by weight, the percentages being based on the total weight of the composition.

32. A curable composition comprising:

I. a polymerizable ethylenically unsaturated urea urethane polymer dispersed in a polymerizable ethylenically unsaturated compound which is prepared by a process comprising reacting a polyisocyanate, at least a portion of which is a diisocyanate, with a polyfunctional amine containing primary and/or secondary amino groups in the presence of:

(a) a polyol, at least a portion of which is a polymeric polyol containing ethylenic unsaturation and having a carbon to oxygen ratio of at least 4/1;

(b) a diluent which is an ethylenically unsaturated compound free of active hydrogens; and (c) an active hydrogen containing polymerizable ethylenically unsaturated compound; under conditions sufficient to form a polymerizable ethylenically unsaturated urea urethane polymer dispersed in a polymerizable ethylenically unsaturated compound;

II. a curing component adapted to cure the urea urethane polymer; said curable composition being characterized by an average RVT Brookfield viscosity of at least about 10,000 centipoise using a number 3 spindle at 20 RPM at a temperature of 23° C.

33. The curable composition of claim 32 characterized by an average RVT Brookfield viscosity of at least about 100,000 centipoise using a number 3 spindle at 20 RPM at a temperature of 23° C.

34. The curable composition of claim 15 characterized by an average RVT Brookfield viscosity of at least about 100,000 centipoise using a number 3 spindle at 20 RPM at a temperature of 23° C.

* * * * *